United States Patent
Landau (10) Patent No.: US 8,189,047 B2
(45) Date of Patent: May 29, 2012

(54) AIRBORNE LASER IMAGE CAPTURING SYSTEM AND METHOD

(75) Inventor: Uzi Landau, Mitzpe Netofa (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 1566 days.

(21) Appl. No.: 10/597,642

(22) PCT Filed: Feb. 3, 2005

(86) PCT No.: PCT/IL2005/000127
§ 371 (c)(1),
(2), (4) Date: Aug. 2, 2006

(87) PCT Pub. No.: WO2005/076036
PCT Pub. Date: Aug. 18, 2005

(65) Prior Publication Data
US 2008/0252728 A1    Oct. 16, 2008

(30) Foreign Application Priority Data
Feb. 5, 2004   (IL) .......................... 160265

(51) Int. Cl.
H04N 7/18      (2006.01)
G03B 19/00    (2006.01)
G03B 17/48    (2006.01)

(52) U.S. Cl. ....................... 348/145; 396/431

(58) Field of Classification Search ............... 348/145
See application file for complete search history.

(56) References Cited

U.S. PATENT DOCUMENTS

| 5,028,998 | A | * | 7/1991 | Westell | 348/145 |
| 5,231,401 | A |   | 7/1993 | Kaman et al. | |
| 5,270,780 | A |   | 12/1993 | Moran et al. | |
| 5,589,905 | A | * | 12/1996 | McIntyre | 396/431 |
| 6,320,611 | B1 |  | 11/2001 | Pepin | |

FOREIGN PATENT DOCUMENTS

GB    2 239 762 A    7/1991
WO   WO 03/102505    11/2003

OTHER PUBLICATIONS

International Search Report for PCT/IL2005/000127.
International Preliminary Report on Patentability PCT/IL2005/000127.
Written Opinion of the International Search Authority PCT/IL2005/000127.

* cited by examiner

*Primary Examiner* — Christopher S Kelley
*Assistant Examiner* — Hee-Yong Kim
(74) *Attorney, Agent, or Firm* — Martin Fleit; Paul D. Bianco; Fleit Gibbons Gutman Bongini & Bianco PL (57) ABSTRACT

The invention relates to an airborne laser image capturing system which comprises: (a) A laser source and laser focal plan array; (b) A pulse generator; (c) A scanning unit for providing to the gimbals a scanning signal for effecting a sequential stepping-scanning movement to scan an area in which the target is included; (d) A motion compensation unit; (e) A timing unit for: (e.i) Activating said pulse generator during a scanning period, thereby to produce over the target a series of illumination spots, each of said spots overlaps at least a portion of one or more adjacent spots; and (e.ii) Activating said laser focal plan array during the illumination of the target thereby to capture many of distinct spot-images (f) A correlating unit for correlating images; and (g) A combining unit for combining the spot-images to a complete image of the scanned area.

6 Claims, 6 Drawing Sheets

AIRBORNE LASER IMAGE CAPTURING SYSTEM AND METHOD

FIELD OF THE INVENTION

The present invention relates to the field of airborne image capturing apparatus. More particularly, the present invention relates to a method for overcoming line of sight vibrations in airborne laser image capturing systems, and therefore increasing the effective range of the system.

BACKGROUND OF THE INVENTION

Attempts to develop an airborne systems for laser image capturing, or laser viewing, are known, and they generally comprise a laser light source for illuminating a target, and means sensitive in the laser light wave-length, such as a focal plan array, for sensing the light reflected from the target (hereinafter, if not specifically otherwise stated, when the term "laser viewing system" is used, it should be noted that it refers also to a "laser capturing system", and vice versa). In some suitable conditions, and generally at dark, laser systems enable the obtaining of target images at ranges slightly larger than can be obtained by equivalent thermal viewing systems.

Two main factors affect the operation of long range laser viewing systems: the conditions of the medium and the stability of the line of sight. In ground laser viewing systems, the laser beam performs a round-trip to the target and back in a generally "unfriendly" medium, which causes an attenuation of the laser signal due to, for example, scattering of the ray, and/or air turbulence. In an airborne system, which operates at high elevations the effects of the medium conditions are significantly reduced because the ray passes mostly through a clear air, while the effect of the stability of the line of sight becomes much more dominant. When the line of sight between the laser source within the airborne system and the target is not sufficiently stable, the sensed image is smeared.

The prior art has offered two main solutions for reducing smearing of the image due to vibrations of the line of sight, as follows:

1. Imaging by one pulse: In this approach, both the laser transmitter and the laser focal plane array are directed towards the target, and then the whole target is illuminated by means of a laser beam made of a single laser pulse in the range of several nanoseconds. In order to illuminate the whole target, the laser beam (which is originally very narrow when emitted from the laser diode), is optically expanded by means of suitable optics before leaving the apparatus (as otherwise the laser beam would illuminate only a small portion of the target). The focal plan array is adapted to receive an image of the whole target in one capturing cycle. The main drawback of this approach is that the expansion of the beam, and the need to obtain an image of the target in one pulse cycle, which is a part of this approach, significantly reduces the amount of photons per unit area that hit any portion of the target, and therefore the maximum effective range of the system is relatively low.

2. Imaging by series of pulses—photon accumulation approach: As in the previous prior art approach, in this approach, the laser source illuminates a whole scene which includes the target by means of a series of laser pulses. The laser beam, after being collimated, is maintained directed towards the target during the accumulative time of all the pulses, while the line of sight to the target is kept as stable as possible by means of gimbals and a compensation unit that provides a motion compensation signal to the gimbals during the period of the pulse transmission and image capturing. The focal plan array is activated during a "window" period in which a reflected pulse is expected, and accumulates the sensed radiation in corresponding pixels, until accumulation of enough photons provides a reasonable signal to noise ratio. The main drawback of this approach is the need to keep a stable line of sight to the target during the transmission of all the series of pulses, and to measure and compensate for very fast and small vibrations of the line of sight. This is generally a very complicated task, particularly in view of the movement and vibrations of the aircraft, resulting in a smeared and/or corrupted image.

It is an object of the present invention to increase the effective range of an airborne laser image capturing system.

It is another object of the present invention to provide means for overcoming the drawback of smeared and low quality images that can be obtained at long ranges, due to a non-stabilized line of sight to the target.

Other objects and advantages of the invention will become apparent as the description proceeds.

SUMMARY OF THE INVENTION

The present invention relates to an airborne laser image capturing system which comprises: (a) A laser source and laser focal plan array, both being mounted on a same gimbals platform; (b) A pulse generator for providing a series of pulses to said laser source during a scanning period, thereby activating laser illumination by said laser source during each of said pulses, the laser source being characterized in that its illumination beam is so concentrated that each pulse provides illumination of only a portion of the expected target; (c) A scanning unit for receiving a line of sight direction to a target, and for providing to the gimbals a scanning signal for effecting a sequential stepping-scanning movement in such a manner as to scan an area in which the target is included; (d) A motion compensation unit for providing to said gimbals, in addition to said scanning signal a motion compensation signal for compensating for the aircraft motion and for the aircraft vibrations; (e) A timing unit for: (e.i) Activating, in coordination with the said scanning unit, said pulse generator during the scanning period, in order to produce over the target a series of illumination spots, each relating to one of said laser pulses, and wherein each of said spots overlaps at least a portion of one or more adjacent spots; and (e.ii) Activating said laser focal plan array during the illumination of the target by each specific pulse in order to capture many of distinct spot-images, each relating to one illumination pulse; (f) A memory unit for receiving from said focal plan array the captured spot-images, and for storing them; (g) A correlating unit for correlating images stored in said memory by finding similarity between features of overlapping portions of neighboring spot-images; and (h) A combining unit receiving information from said correlating unit for combining the spot-images to form a complete image of the scanned area Preferably, the degree of overlap is determined by the speed of scanning movement, and by the rate of the series of pulses generated by the pulse generator.

Preferably, the amount of overlapping between spots is inversely proportional to the distance from the target. When the target is close the amount of overlapping can be smaller.

Preferably, the gimbals receive a direction signal to the target from a target locating unit, and motion compensation signal from a motion compensation unit.

Preferably, the size of the scanning steps is made inversely proportional to the range to the target.

Preferably, the laser divergence is in the range of 0.1 mrad to 0.3 mrad.

Preferably, the rate of overlap between adjacent spots is in the range of 10%-30%.

DETAILED DESCRIPTION OF PREFERRED EMBODIMENTS

Figure 1:
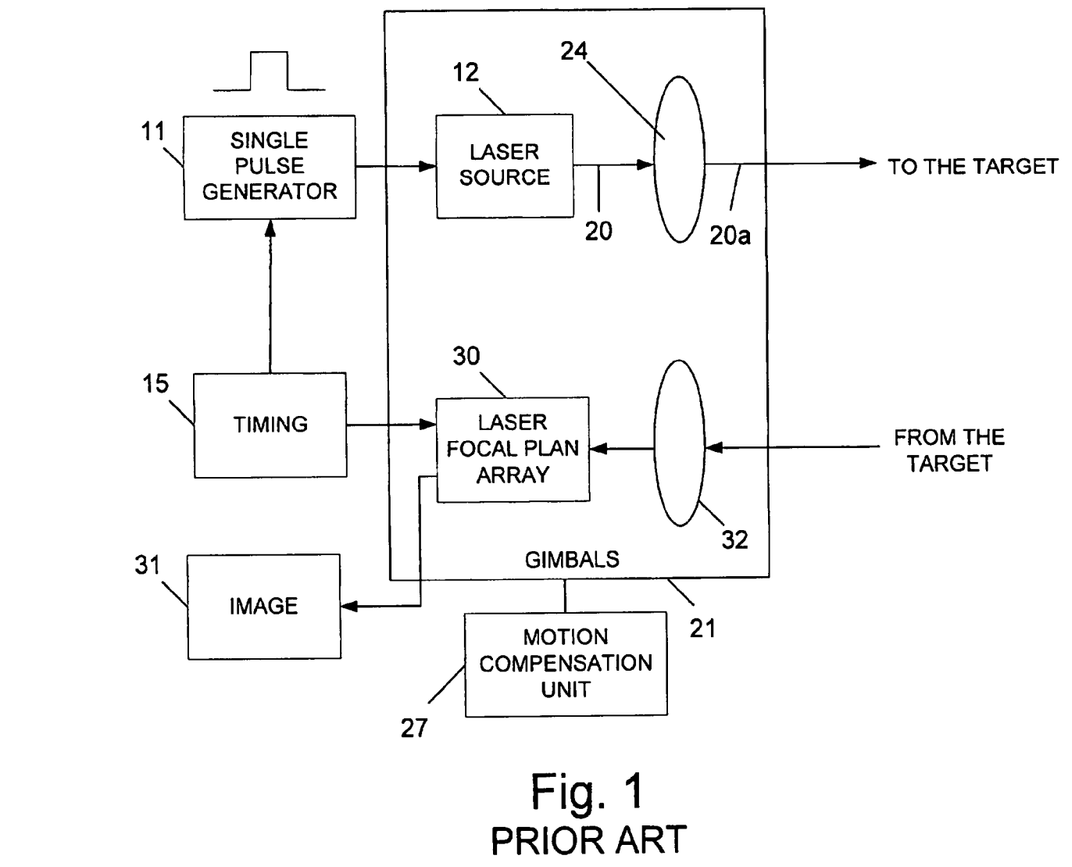
FIG. 1 is a block diagram illustrating a laser capturing system according to a first prior art embodiment.

An airborne laser image capturing system according to a first prior art embodiment is shown in a general, block diagram form in FIG. 1. In order to overcome the vibrating, non-stabilized line of sight to the target, the pulse generator 11 produces a single pulse for each captured image of the whole target. The laser source 12, which is positioned on, and maintained directed towards the target by means of gimbals 21, produces a beam 20, which is then expanded by means of beam expender optics 24. The beam divergence of the light ray is in the order of about 1 mrad to 3 mrad. The expanded beam 20a "illuminates" the target (not shown, for example a tank, vehicle, building, etc.). At the receiving portion, a laser focal plane array 30, is activated by the timing unit 15 to sense the reflections from the target, which are then captured to produce an image 31 of the target. Also shown in FIG. 1 is the focusing optics 32, which focuses the target on the focal plane array. The fact that the whole target is illuminated at once by said single-pulse expanded beam, and that the transmitted laser pulse is relatively very short, in the order of about few nanoseconds, enables obtaining with the limitations of the existing sensors making the focal plan array, a reasonable image in ranges of up to about 10 km. However, images of targets beyond this range cannot be obtained with a reasonable signal to noise ratio, due to the need of a significantly stronger laser source, which as said above is necessary in order illuminate and enable capturing of a whole target in one laser pulse. The expansion of the beam, of course, causes a reduction in the number of photons per unit area that hit the target, and therefore the signal to noise ratio is reduced along with the maximum effective range.

It should be noted, that the gimbals are maintained directed to the target during the target illumination and image capturing by means of a motion compensation unit 27, in a manner well known in the art.

Figure 2:
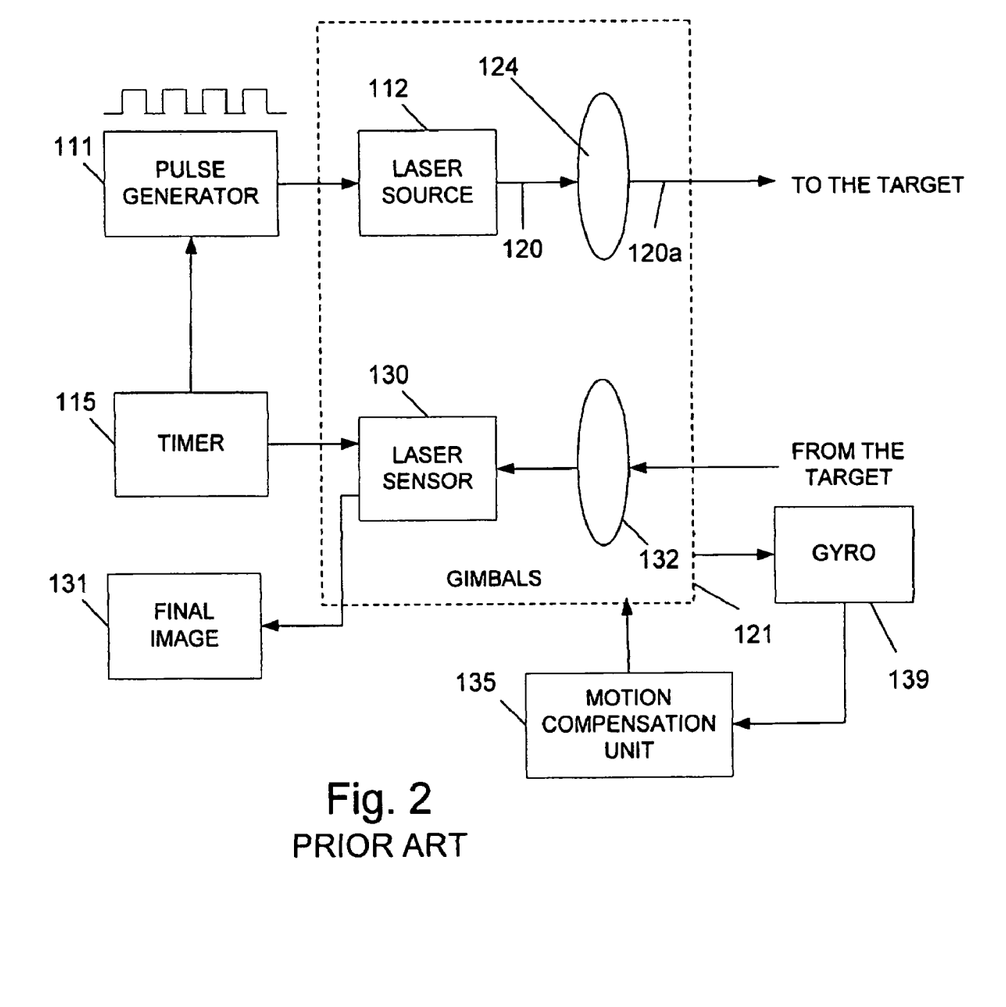
FIG. 2 is a block diagram illustrating a laser capturing system according to a second prior art embodiment.

FIG. 2 shows a laser image capturing system according to a second prior art embodiment. In said second embodiment, the pulse generator 111 produces a series of pulses, that are provided to the laser source 112. The radiation emitted by the laser source 112, i.e., beam 120, passes through expanding optics 124, and the resulting beam 120a is transmitted towards the scene where the target is located. The width of the ray is in the range of 1 mrad to 3 mrad. As before, both the laser source and sensor are located on a same gimbals' platform which directs them towards the target. Light reflected from the target passes through focusing optics 132, and focused on the laser plan array 130. Timer 115 activates a "capturing window" for the focal plan array 130 only during the expected time of arrival of each reflected pulse, to perform accumulation the reflected light. A final image, which is the sum of all the images produced as a result of each distinct reflected pulse are captured at the final image unit 131. A Gyro 139 measures the Line of Sight vibrations, and sends suitable indications to the motion compensation unit 135. The motion compensation unit 135 processes the vibration indications, and provides a continuous compensation signal to the gimbals 121 in order to maintain the laser source 112 and sensor 130 continuously directed to the target during the whole capturing period, i.e., during the whole time in which all the reflected pulses impinge on the sensor 130. In this manner, the accumulation of the reflected photons relating to the series of the reflected laser pulses improves the signal to noise ratio. However, and as said above, the compensation for the aircraft motion and vibrations during the capturing period (i.e., in this case during receipt of all the reflected pulses) is relatively complicated, and results in a relatively smeared image, particularly when far targets are imaged.

Figure 3:
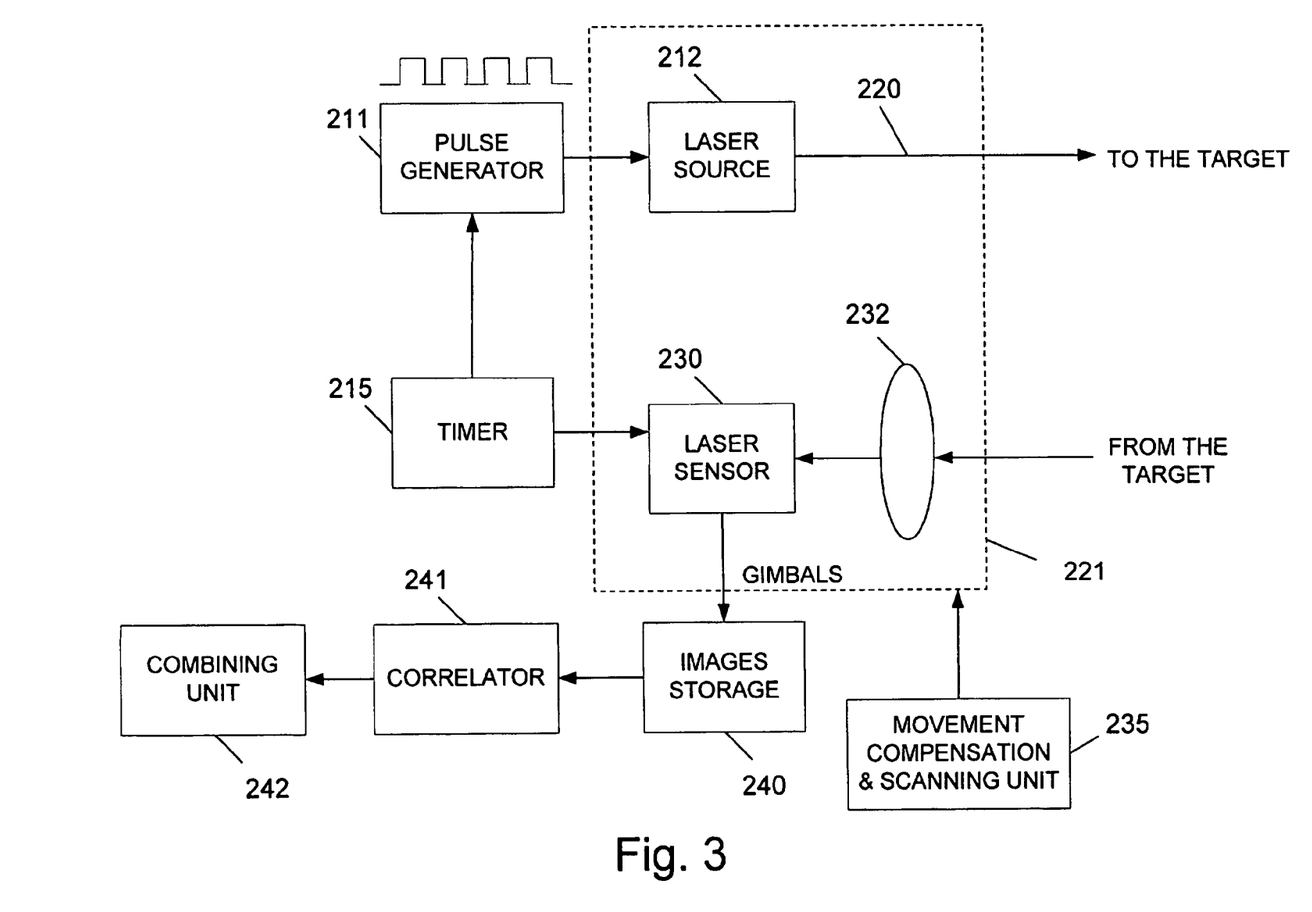
FIG. 3 is a block diagram illustrating the system of the present invention.

A block diagram of a laser image capturing system according to the present invention is shown in FIG. 3. As before, the system comprises a pulse generator 211 that provides a series of activation pulses to laser source 212. The laser source 212 produces a series of corresponding laser pulses that are transmitted as beam 220 towards the target. As in the prior art, the laser source 212 and the laser sensor 230 are positioned on a same gimbals' platform 221, which in turn maintains a proper direction to the target. However, in contrast with the prior art systems of FIGS. 1 and 2, the system of the present invention does not comprise any beam expander optics (such as 24, or 124 of FIGS. 1 and 2 respectively). The lacking of said beam expanding optics causes the laser beam 220 to be much more concentrated and intense, (i.e., in the range of about 0.1 mrad to 0.3 mrad), in comparison with the prior art, and therefore the maximum effective range increases significantly. However, in view of the concentration of the beam, the size of the illumination spot on the target is also reduced significantly. If, for example, in the prior art the wide beam hitting a target located at a range of 10 km results in a spot on the order of 15 m×15 m (which is the size of a typical target), in the present invention the spot size is in the order of about 150 cm×150 cm. Such a spot size of the present invention, whenever captured by the sensor 230, does not enable recognition of average targets such as tanks whose size is much larger. A solution to this problem is provided by the present invention.

Figure 4:
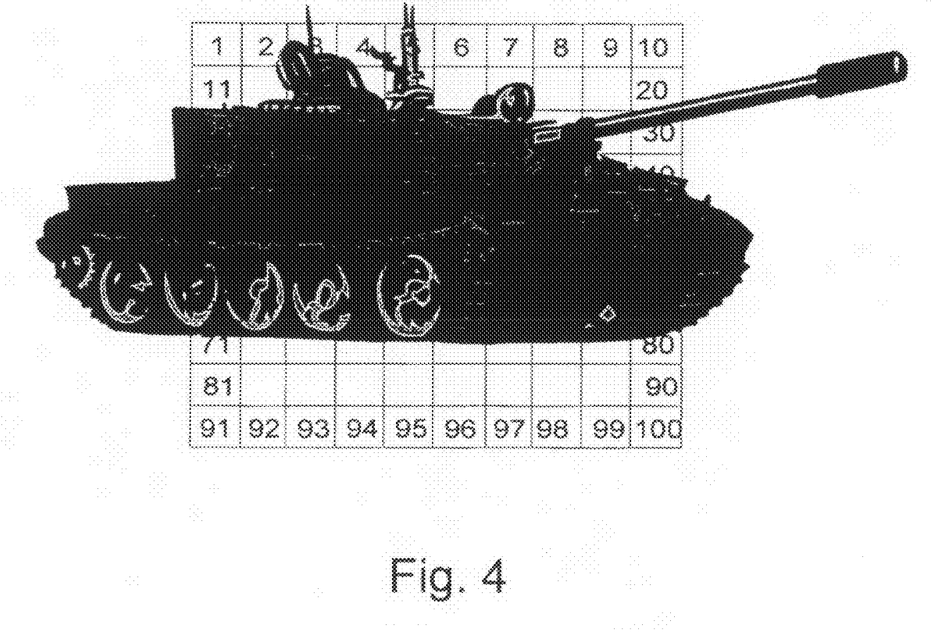
FIG. 4 illustrates a scanning scheme of a target, according to an embodiment of the invention.
Figure 5:
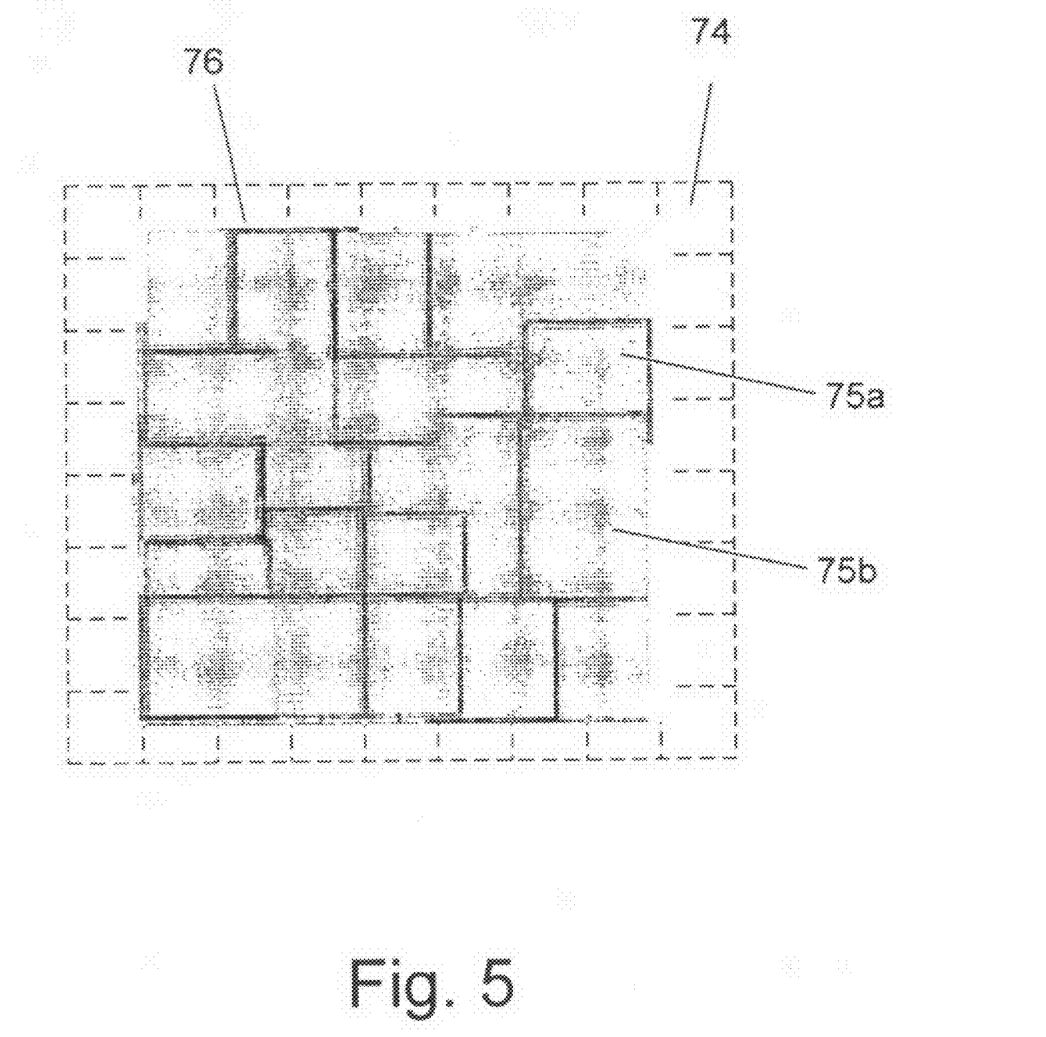
FIG. 5 illustrates a complete image as combined by the image combining unit.

According to the present invention, and due to the narrow beam, each illumination spot and therefore the image that is acquired covers only a small portion of an average target (for example a vehicle, a tank, etc.). According to the present invention, in order to receive an image of the whole target the gimbals are supplied with a signal that causes the beam to scan the whole target (in this application, whenever referring to the present invention, whenever the term "spot-image" is used, it relates to an image of a portion of a target, i.e, as obtained from one spot illumination. Whenever the term "complete image" or "full image" is used, it refers to an image relating to (at least) the full target, which as will be described hereinafter, is combined from many of such smaller spot-images, each relating to a portion of a target). An example for a scanning scheme is illustrated in FIG. 4. For example, if an image of a target such as a tank is needed, the relevant area of the tank and a part of its surroundings is divided into sub-areas that define a virtual grid, for example, 49 sub-areas are shown in FIG. 4. Thereafter, the gimbals perform a sequential scanning operation, for example, from sub-area 1 to 7, then to sub-area 8, 9, 10, . . . 14, 15, 16 . . . 49. During the scanning procedure, many of corresponding images are captured, one from each sub-area (each representing a different small portion of the target). It should be noted that the virtual sub-areas are so designed to have an area which is smaller than the expected illumination spot on the target. In such a manner, each received image covers an area which is larger than a single sub-area, and which overlaps at least a portion of at least some of the neighboring sub-areas. Each of the received images are transferred from the laser sensor to a memory storage 240 and saved there for later processing. From the memory, the images are provided to a correlating unit 241. As said, there are overlapping portions between adjacent sub-areas at the received spot-images. By using the correlation between said overlapping portions of the sub-areas, and by using known image processing techniques, the combining unit 242 combines in a mosaic fashion the individual images and forms a complete image of the scene which includes the target. An example of a combined, complete image is shown in FIG. 5. The original grid of the scene is indicated as numeral 74. The portions, such as portions 75a and 75b are portions as produced by the combining unit 242, based on the correlation between adjacent spot-images. The combining unit then combines the portion to a complete image 76.

It has been found that overlapping in a range of 10% to 30% between neighboring images is required in order to produce a mosaic representing a complete image of the target.

Preferably, in view of the expansion of the laser ray with the increase of the range to the target, the size of the scanning steps by the gimbals is also made inversely proportional to the range to the target. More particularly, for a closer target range the size of the scanning steps is larger than for a farther target range.

According to the present invention the duration of each laser pulse (which relates to one spot) is in the range of a few nanoseconds.

The system of the present invention is much less sensitive to vibrations of the aircraft, for two main reasons:
  a. Each image which is acquired is essentially independent of vibrations that may occur, since each image is captured during a very short period, preferably in the order of a few nano-seconds duration, during which the vibrations of the aircraft are negligible.
  b. In the complete image, the accumulative effect of vibrations, that exists in the prior art, is eliminated, as the correlation unit 241 and the combining unit 242 arrange the mosaic complete image according to correlation or similarity of features within the overlapping portions between adjacent spot-images. As long as enough overlapping between images exists, the correlation and combining units will be able to produce the full, complete image. Each spot-image which is captured is essentially independent of the others, and the correlation does not involve any accumulative effect.

The system of the present invention can obtain much longer range, for two main reasons:
  a. The signal to noise ratio is significantly improved due to the lack of expansion of the beam, and the resulting increase of the beam intensity per target unit area; and
  b. There is no smear in the complete image in view of the elimination of the accumulative effects as stated above. This is particularly significant when capturing images in long range, in comparison with the prior art, in which a substantial degradation of the image exists due to smearing.

Figure 6A:
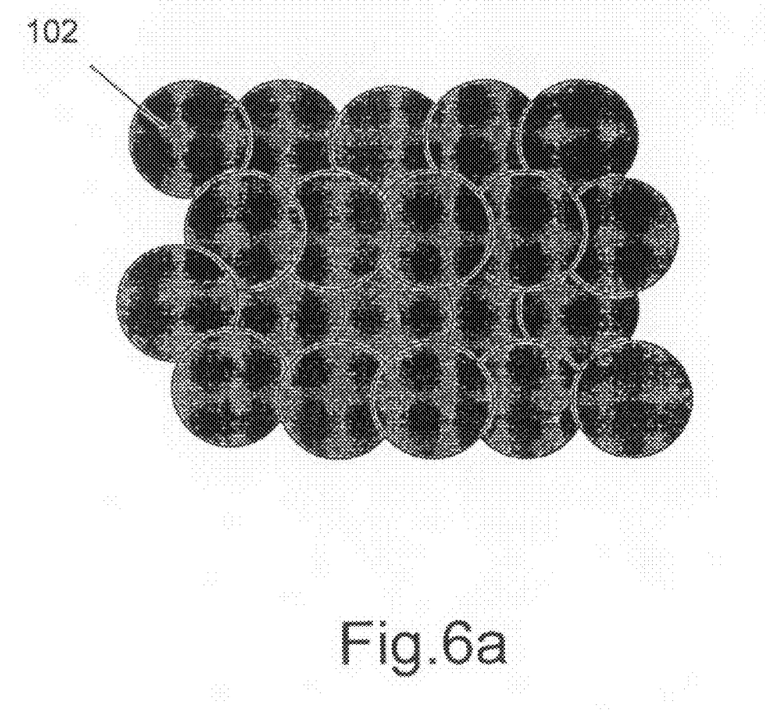
FIG. 6a illustrates the scanning of a short range target according to an embodiment of the invention.
Figure 6B:
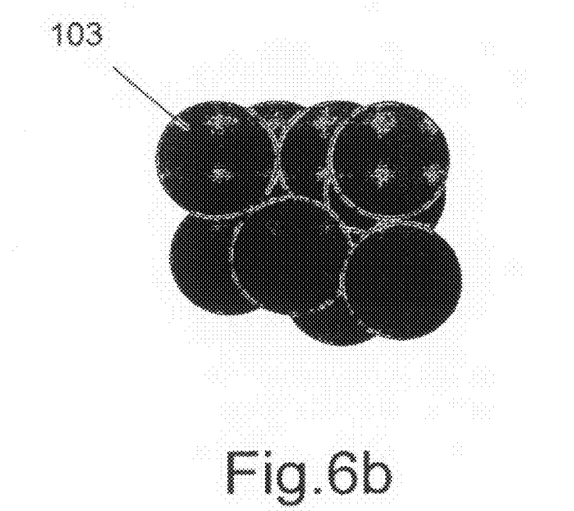
FIG. 6b illustrates the scanning of a long range target according to an embodiment of the invention.

FIGS. 6a and 6b, are examples showing capturing of images of a near and far target respectively. Preferably, the amount of overlapping between images depends on the range to the target. For example, at a closer range, where the intensity of the signal hitting the target is high, and so is the resolution, it is possible to obtain a full image by means of minimal overlapping of spots 102 over the target (as shown in FIG. 6a). At a longer range, where the signal to noise ratio is low, it is possible to improve the image quality by increasing the amount of overlap between spots 103, as shown in FIG. 6b. In any case, the correlating unit 241, and the combining unit 242, by use of correlation and image processing techniques can produce a full image of the target.

Gimbals which are capable of producing both a compensation motion and a stepping-scanning motion, as are used by the present invention are known in the art, and are described also in International Application No. PCT/IL03/00422, the content of which is incorporated herein by reference.

The system of the present invention is much more efficient because when selecting proper size of scanning steps (that as said are inversely proportional to the range), most of the energy which is radiated hits the target. In the systems of the prior art, however, if the laser beam has a width of, for example, 2 mrad, at distance of 20 Km, only about 1% of the light hits the target due to the proportional expansion of the laser beam with the range.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An airborne long-range laser imaging system, for obtaining an image showing high resolution details of a specific object having dimensions in the order of several meters, and which is located at a distance above 10 Km, comprising:
  (a) a laser source and focal plan array sensing detector, both being mounted on a same gimbals platform;
  (b) a pulse generator for providing a series of pulses to said laser source during a step-scanning period, thereby activating laser illumination by said laser source during each of said pulses, the laser source being characterized in that the width of the illumination beam is in the range of 0.1 mrad to 0.4 mrad so that it produces an illumination spot that covers only a portion of said object having dimensions of up to several meters and located at a long range of above 10 Km;
  (c) a scanning unit for receiving a line of sight direction to said object, and for providing to the gimbals a scanning signal for effecting a stepping-image capturing sequence in such a manner as to scan the object and the area in which said object is included, wherein said area having dimensions in the order of up to a few tens of meters;
  (d) a motion compensation unit for providing to said gimbals, in addition to said scanning signal a motion compensation signal for compensating for the aircraft motion and for the aircraft vibrations;
  (e) a timing unit for:
    (i) activating, in coordination with the said scanning unit, said pulse generator during the scanning period, in order to produce over the target a plurality of illumination spots, each relating to one of said laser pulses, and wherein each of said spots overlaps at least a portion of one or more adjacent spots; and (ii) activating, in a non-gated manner, said focal plan array sensing detector during the illumination of the target by each specific pulse in order to capture a plurality of distinct spot-images, each relating to a single illumination pulse;

(f) a memory unit for receiving from said focal plan array sensing detector the captured spot-images, and for storing them;

(g) a correlating unit for correlating images stored in said memory by finding similarity between features of overlapping portions of neighboring spot-images; and (h) a combining unit receiving information from said correlating unit for combining the spot-images to form a complete image of the scanned area.

2. A system according to claim 1 wherein the degree of overlap is determined by the speed of scanning movement, and by the rate of the series of pulses generated by the pulse generator.

3. A system according to claim 1 wherein the amount of overlapping between spots is inversely proportional to the distance from the object.

4. System according to claim 1 wherein the gimbals receive a direction signal to the object from an object locating unit, and motion compensation signal from a motion compensation unit.

5. System according to claim 1 wherein the size of the scanning steps is made inversely proportional to the range to the object.

6. System according to claim 1 wherein the rate of overlap between adjacent spots is in the range of 10%-30%.

* * * * *